US006891342B2

United States Patent
Nakamura et al.

(10) Patent No.: US 6,891,342 B2
(45) Date of Patent: May 10, 2005

(54) DRIVE APPARATUS FOR PWM CONTROL OF TWO INDUCTIVE LOADS WITH REDUCED GENERATION OF ELECTRICAL NOISE

(75) Inventors: Koji Nakamura, Toyohashi (JP); Satoshi Yoshimura, Kariya (JP); Takuya Usami, Kariya (JP)

(73) Assignee: Denso Corporation, Kariya (JP)

( * ) Notice: Subject to any disclaimer, the term of this patent is extended or adjusted under 35 U.S.C. 154(b) by 70 days.

(21) Appl. No.: 10/636,598

(22) Filed: Aug. 8, 2003

(65) Prior Publication Data

US 2004/0027105 A1 Feb. 12, 2004

(30) Foreign Application Priority Data

Aug. 8, 2002 (JP) ......................................... 2002-231433
Aug. 9, 2002 (JP) ......................................... 2002-233022

(51) Int. Cl.⁷ .............................. H02P 5/46; H02P 7/74
(52) U.S. Cl. ............................. 318/77; 318/46; 318/47; 318/51; 318/811
(58) Field of Search ................ 318/34–113; 363/25–28, 363/37, 40, 39, 41, 45–47, 124

(56) References Cited

U.S. PATENT DOCUMENTS

| 4,390,821 | A | * | 6/1983 | Krampe et al. ................ 318/85 |
| 4,641,069 | A | * | 2/1987 | Fujioka et al. .............. 318/625 |
| 5,087,867 | A | * | 2/1992 | Kruppa ........................ 318/696 |
| 5,352,965 | A | * | 10/1994 | Kawabata .................... 318/807 |
| 6,404,150 | B1 | * | 6/2002 | Nehl et al. ..................... 318/34 |
| 6,552,505 | B2 | * | 4/2003 | Naito ........................... 318/63 |
| 6,556,460 | B2 | * | 4/2003 | Ishida et al. ................... 363/39 |
| 6,633,495 | B2 | * | 10/2003 | Ishda et al. .................... 363/95 |
| 6,829,151 | B2 | * | 12/2004 | Elferich et al. ............... 363/17 |
| 2003/0043605 | A1 | * | 3/2003 | Ishida et al. .................. 363/39 |
| 2003/0107905 | A1 | * | 6/2003 | Miura et al. .................. 363/41 |

FOREIGN PATENT DOCUMENTS

| JP | 5-118216 | 5/1993 |
| JP | 6-165307 | 6/1994 |
| JP | 6-189593 | 7/1994 |
| JP | 9-331696 | 12/1997 |
| JP | 10-8959 | 1/1998 |
| JP | 10-146098 | 5/1998 |
| JP | 2002-43910 | 2/2002 |

OTHER PUBLICATIONS

U.S. Appl. No. 10/351,310: filed Jan. 27, 2003.
U.S. Appl. No. 10/411,374: filed Apr. 11, 2003.
U.S. Appl. No. 10/606,863: filed Jun. 27, 2003.

* cited by examiner

Primary Examiner—David Martin
Assistant Examiner—Patrick Miller
(74) Attorney, Agent, or Firm—Posz Law Group, PLC

(57) ABSTRACT

A drive apparatus for driving two motors by PWM control of respective switching elements connected to the motors, whereby respective control signals are applied to the switching elements such that each commencement of a transition of one of the switching elements from the non-conducting to the conducting state coincides with the termination of a transition of the other switching element from the conducting to the non-conducting state, thereby reducing generated electrical noise, and for supplying equivalent values of drive voltage to two motors of different power ratings which rotate respective cooling fans, to obtain equalized levels of air flow rate.

13 Claims, 10 Drawing Sheets

DRIVE VOLTAGE A
(10 V/DIV)

DRIVE VOLTAGE B
(10 V/DIV)

SUPPLY CURRENT RIPPLE
(MEASUREMENT POINT C)
(AC: 1 A/DIV)

DRIVE VOLTAGE A
(10 V/DIV)

DRIVE VOLTAGE B
(10 V/DIV)

SUPPLY CURRENT RIPPLE
(MEASUREMENT POINT C)
(AC: 1 A/DIV)

US 6,891,342 B2

DRIVE APPARATUS FOR PWM CONTROL OF TWO INDUCTIVE LOADS WITH REDUCED GENERATION OF ELECTRICAL NOISE

BACKGROUND OF THE INVENTION

1. Field of Application

The present invention relates to an inductive load drive apparatus for applying PWM (pulse width modulation) control to mutually separately drive a pair of inductive loads that are connected to a DC power source.

2. Description of Prior Art

In the prior art, various methods have been proposed for overcoming the problems that arise when a plurality of loads are driven in parallel, with the driving being based on PWM control signals. For example with Japanese patent 2002-43910, it is ensured that each falling edge of a PWM control signal that controls driving of one of the loads coincides with a rising edge of the PWM control signal that controls driving of the other load, for thereby ensuring that an increase in load current of one of the loads will be cancelled by a decrease in load current of the other load, and so reduce variations in the overall load current. That is to say, if both of the loads were to be supplied with load current concurrently at any time, then a large increase in the overall load current would occur. However with that invention, by establishing a shift between the conduction timings of the two loads, it is ensured that the degree of variation of the overall load current is minimized.

Such a technique has been successfully applied in the case of resistive loads, such as the headlamps of a vehicle. However it would be desirable to be able to apply a similar method to driving inductive loads, such as electric motors. When a switching element such as a FET (field effect transistor) is used to control current flow through an inductive load from a DC power source such as a battery, with a rectangular-waveform PWM control signal being applied to the switching element, then each time the switching element is set in the off state, a regenerative (i.e., reverse-polarity) current flow occurs from the inductive load back into the power source. As a result, the waveform of power source current flow is approximately sinusoidal.

FIG. 7 is a comparative example for illustrating how it might be attempted to adapt the technique of the above-mentioned Japanese patent to the case of driving a pair of inductive loads, which will be assumed to be respective motors. In FIG. 7, a series combination of a motor 2A and MOS FET 2A and a series combination of a motor 2B and MOS FET 2B are connected in parallel between the potential of a DC power source consisting of a battery 1 and ground potential. More specifically, the drains of the MOS FETs 2A, 2B are connected through respective diodes 4A, 4B to one side of a π-configuration filter (referred to in the following simply as a π filter) 5, with the other side of the π filter 5 connected to the potential of the battery 1, and with the diodes being connected in a direction such as to be reverse-biased when the corresponding MOS FET is set in the on state. (It should be noted that neither the diodes 31A, 31B nor the π filter 5 are described in the aforementioned Japanese patent 2002-43910, which describes the driving of resistive loads only).

When a MOS FET 3A or 3B is switched from the on to the off state, a resultant regenerative current flows from the corresponding one of the motors 2A, 2B through the corresponding one of the diodes 4A, 4B into the battery 1. The π filter 5, which is formed of a coil 8 and capacitors 6, 7 as shown, serves to absorb these flows of regenerative current and thereby smooth out fluctuations in the potential of the battery 1 which would otherwise result from such flows of regenerative current.

A pair of PWM control signals A and B having identical duty ratio, produced from a control IC 9, are applied through respective drive circuits 10A, 10B as respective PWM to the gates of FETs 3A, 3B respectively. When a FET 3A or 3B is set in the on state, current flows from the battery 1 through the corresponding one of the motors 2A, 2B and that FET to ground potential. When that FET 3A or 3B is then set in the off state, a delayed current flows through the corresponding one of the diodes 4A, 4B to the π filter 5, to return to the battery 1 as a regenerative current. This regenerative current flow is smoothed by the capacitor 6 of the filter 5. The capacitor 7, on the opposite side of the π filter 5 from the diodes 4A, 4B, serves to smooth fluctuations in the potential of the battery 1.

However with such a configuration, the level of the regenerative current is substantial, so that it is necessary to use a large value of capacitance for the capacitor 6. In order to minimize the necessary capacitance of the capacitor 6, it is desirable to reduce the peak level of the regenerative current as far as possible.

FIGS. 8A, 8B illustrate the effect of changing the phase difference between the PWM control signals A and B upon the waveform of a ripple component which appears in the supply current of the battery 1 with the circuit of FIG. 7, for the case in which the PWM control signals are of approximately rectangular waveform. The ripple component is measured at the positive terminal of the battery 1.

FIG. 8A shows the power supply voltage waveforms for MOS FETs 3A, 3B as measured at points A, B in FIG. 7, when the PWM control signals are of identical phase. In that case the motors 2A, 2B are supplied with power concurrently, and hence a large amplitude of ripple appears in the power source current from the battery 1. However if a suitable phase difference is established between the control signals A and B, such as to ensure that the motors 2A, 2B are not supplied with current simultaneously from the battery 1, as shown in FIG. 8B, then the amount of ripple can be substantially reduced.

A problem arises with such a method whereby the motors 2A, 2B are driven alternately as shown in FIG. 8B, in that the frequency of the ripple component in the supply current of the battery 1 is doubled, by comparison with the case in which the motors are driven concurrently. As a result, electrical noise is generated at the frequency of that ripple component. The overall noise level of the vehicle electrical system is thereby increased.

It might be envisaged that this problem could be overcome by forming the control signals with a trapezoidal waveform and arranging that the start of each rising edge of one of the control signals A and B is made to coincide with the start of a falling edge of the other one of these signals, as illustrated in the timing diagram of FIG. 9A. It would appear that such a method could substantially reduce the level of the ripple component. However in practice, due to the intervals in which both of the FETs 3A, 3B are conducting simultaneously, that is to say when a turn-on interval (i.e., transition interval from the non-conducting to the conducting state) of one FET overlaps a turn-off interval (i.e., transition interval from the conducting to the non-conducting state) of the other FET as illustrated in FIG. 9A, distortion of the waveform of the ripple component of the supply current of the battery 1 is produced. This waveform distortion increases the level of electrical noise.

Another problem which arises in the prior art with respect to driving a plurality of motors constituting respective inductive loads is as follows. In certain applications, such as driving the cooling fans which direct air flows into the engine radiator and into the condenser of the air conditioner system of a motor vehicle, it is desirable that identical rates of air flow are produced by each of the cooling fans, in order to maximize the efficiency of the cooling operation. Thus, for example in the case of using two motors in parallel in such an application, it would be preferable to be able to utilize two motors which have identical values of power rating, for example which are both rated at 100 W, or are both rated at 200 W, to ensure that identical levels of power are produced by the motors when they are driven by respective PWM voltages of identical duty ratio. However it might be necessary that the maximum amount of output power that will be produced (in total) by the motors is for example to be 260 W. In such a case, since it is very possible motors having a power rating of 130 W may not be available, it might in practice be necessary to use a pair of motors which have respectively different values of power ratings, for example a combination of a 100 W motor and a 160 W motor. However with prior art methods of PWM drive control of such a combination of motors by using a common value of PWM duty ratio for both motors (and so, identical levels of average drive voltage) this would result in unbalanced amounts of output power being produced by the motors. Such cases of having to utilize an unbalanced combination of motors are very frequent in the prior art, and lead to inefficiency in such applications as driving the cooling fans of a vehicle as described above.

SUMMARY OF THE INVENTION

It is an objective of the present invention to overcome the above problems of the prior art by providing an inductive load drive apparatus for application to driving two inductive loads mutually separately, whereby only small values of capacitance are required for capacitors that are used in constituting a filter such as a π-configuration filter which is incorporated for absorbing regenerative current flow, and whereby generation of electrical noise due to fluctuations in the supply current of a DC power source such as a vehicle battery which powers the apparatus can be held at a low level.

To achieve the above objective, according to a first aspect, the invention provides an inductive load drive apparatus for mutually independently driving two inductive loads that are connected to a DC power source, by PWM operation, with the apparatus having a control circuit that includes two switching elements which are respectively connected in series between the two inductive loads and the DC power source, each of the switching elements controllable for being switched to an on state and an off state for thereby enabling and inhibiting a supply of a drive current from the power source through the corresponding one of the inductive loads, a π-configuration filter formed of an inductor and two capacitors, coupled to the pair of switching elements for providing a flow path for a regenerative current which flows to the power source from an inductive load when a switching element corresponding to the inductive loads is set in the off state. The control circuit is characterized in comprising phase control means for controlling generation of the two PWM control signals such that each timing of termination of each first-direction edge of a specific one of two PWM control signals that respectively control the switching elements (i.e., an edge direction whereby the corresponding switching element is changed to the off state) coincides with a timing of the start of a second-direction edge of the other one of these PWM control signals (i.e., and edge direction whereby the corresponding switching element is changed to the on state).

By establishing such a phase relationship between the two PWM control signals, it is ensured that the two switching elements can never be simultaneously set in the on state. The level of ripple in the supply current from the power source, and amount of distortion (i.e., in relation to a sinusoidal waveform) of residual ripple in that supply current, can thereby be made very small. Hence, generation of electrical noise is suppressed, and it is only necessary to use relatively small values of capacitance for the capacitors which constitute the π filter.

If the PWM control signals have a high frequency, then these signals themselves may become a source of electrical noise. For that reason, according to another aspect, the control circuit includes waveform shaping circuit means for shaping each of the two PWM control signals to have a trapezoidal waveform. In that way, each of the transitions between the high and low levels of each of the PWM drive voltages produced by the switching elements is made more gradual than is the case for a rectangular waveform, and this is effective in reducing the generation of electrical noise.

Moreover by forming the waveforms of the PWM control signals with a trapezoidal shape, whereby at each transition, a PWM control signal gradually rises to a level at which the corresponding switching element is set completely in the on (i.e., conducting) state, or gradually falls to a level whereby that corresponding switching element is set in the off (i.e., non-conducting) state, the duration of each of the intervals in which a switching element remains in the on state is made longer with respect to the duration of each interval in which the switching element is in the off state. By applying such a feature to an apparatus configured according to the first aspect of the invention described above, it becomes possible to ensure that the respective intervals in which the two switching elements are in the on state will never coincide, irrespective of the value of duty ratio that is established for the PWM control signals. Hence, further effectiveness in reducing the generation of electrical noise can be achieved.

It is a further objective of the invention to overcome the problem of the prior art described hereinabove whereby unbalanced levels of output power are produced by respective inductive loads constituted by a plurality of motors, such as motors which operate cooling fans of a motor vehicle, which are each controlled by a prior art type of PWM drive apparatus.

To achieve the latter objective, the invention provides an inductive load drive apparatus for driving of at least two inductive loads constituted by respective motors having mutually different power output ratings, by PWM control of respective switching elements connected to the motors, wherein the apparatus comprises a voltage compensation circuit for modifying respective PWM control signals applied to the switching elements such as to apply respectively different values of drive voltage to the motors, with the respectively different values of drive voltage being predetermined in accordance with the respective power output ratings of the motors.

In the case of an application in which the motors drive cooling fans, the respectively different values of drive voltage are predetermined in accordance with the respective power output ratings of the motors such as to ensure that identical values of air flow are produced by the cooling fans.

In general, such an inductive load drive apparatus receives an input drive command signal from an external source, having a parameter value (e.g., PWM duty ratio) that expresses a required level of total output power from the combination of motors. With the present invention, for each of two or more motors which may have respectively different ratings, a voltage compensation circuit derives a compensation voltage by obtaining the average value of drive voltage that is currently being applied to the motor and multiplying that value by a presettable amplification factor. The drive command signal is expressed as a drive command voltage (e.g., by conversion from a PWM signal, if necessary) and the compensation voltage is applied to modify that drive command voltage. The resultant compensated drive command voltage is applied to determine the duty ratio for operating the switching element of that motor, and thereby determine the average value of drive voltage applied to the motor. The amount of compensation thereby applied for each motor is determined such that respectively equivalent values of average drive voltage are applied to the motors, determined such that substantially identical levels of output power (e.g., measured as respective values of air flow rate from fans which are driven by the motors) are produced by the motors, irrespective of changes in the input drive command signal.

DESCRIPTION OF PREFERRED EMBODIMENTS

Figure 1:
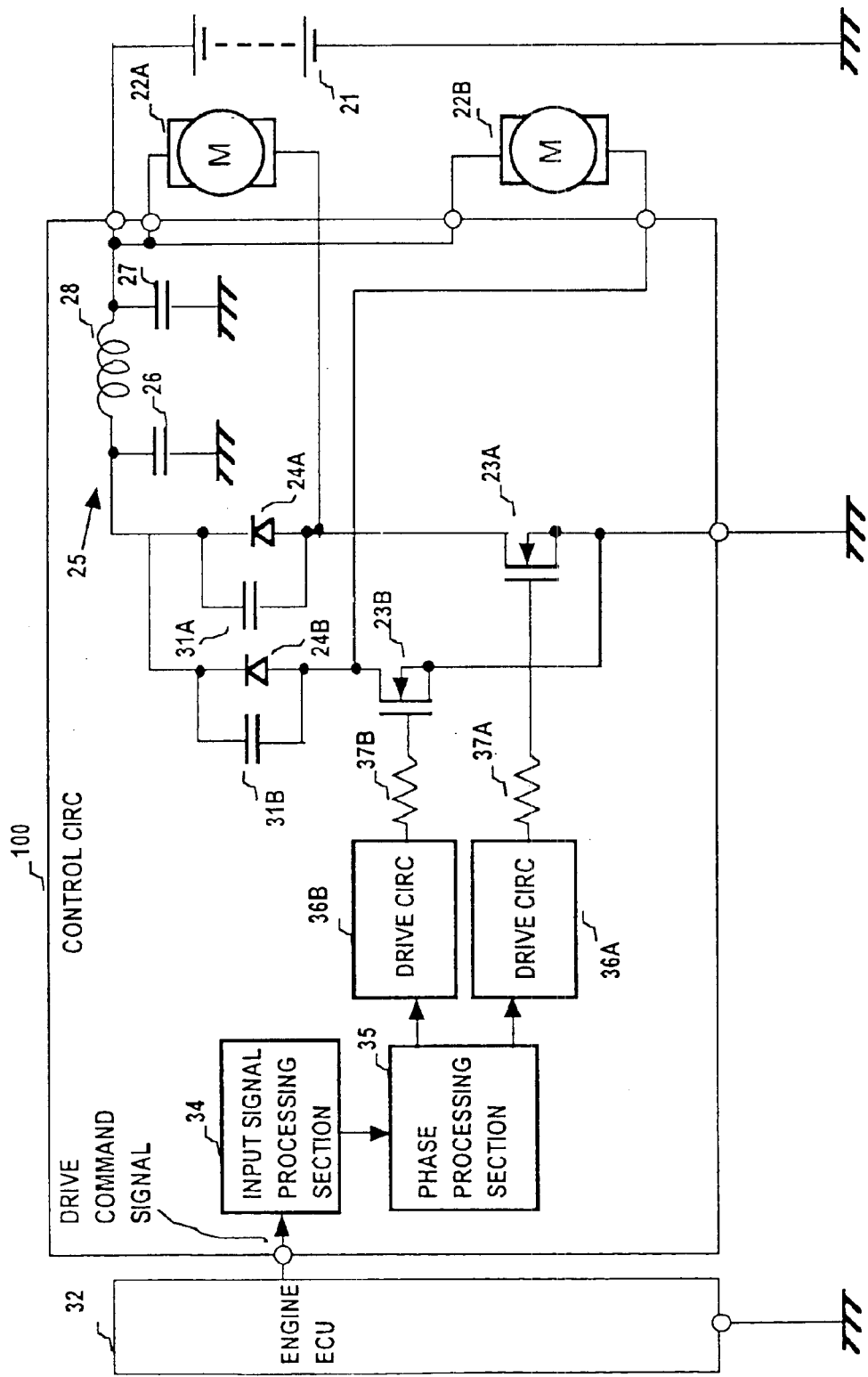
FIG. 1 is a general system block diagram of a first embodiment of an inductive load drive apparatus.
Figure 7:
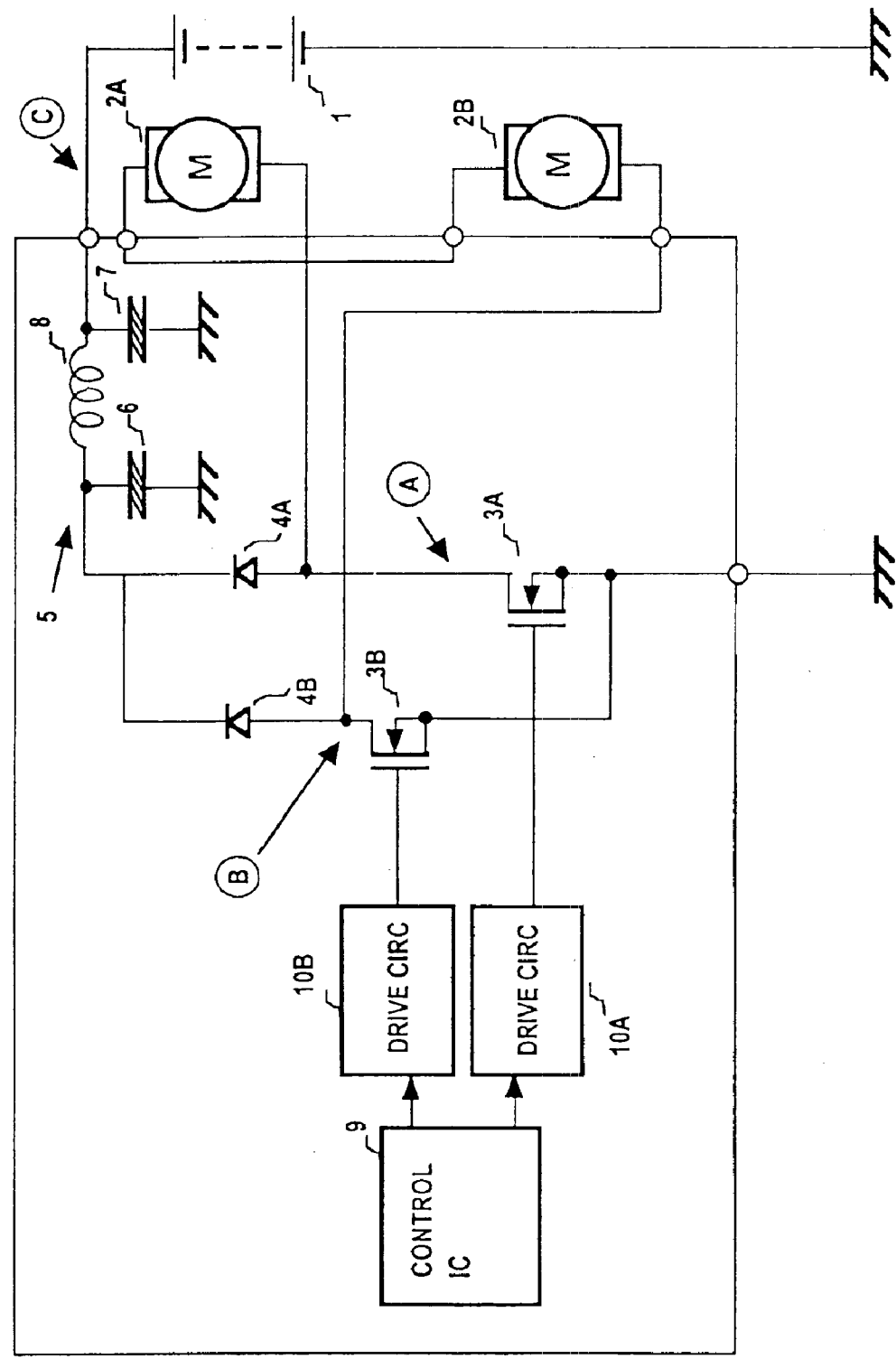
FIG. 7 is a general system block diagram of a comparative example, which is a possible modified configuration of a prior art type of PWM load drive apparatus.
Figure 8A:
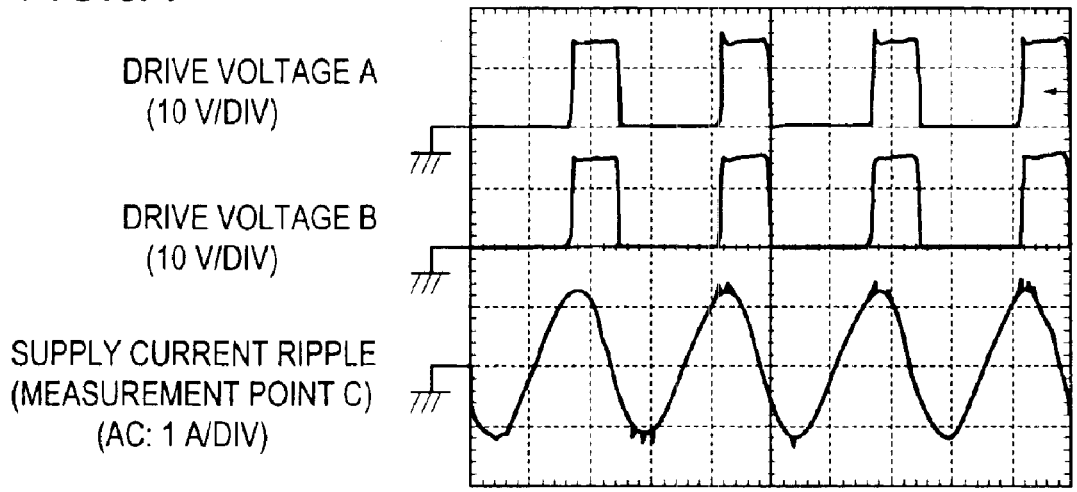
FIGS. 8A, 8B are waveform examples corresponding to those of FIGS. 4A to 4C, for illustrating the relationship between supply current ripple and a phase difference between respective PWM drive voltages of two motors.
Figure 8B:
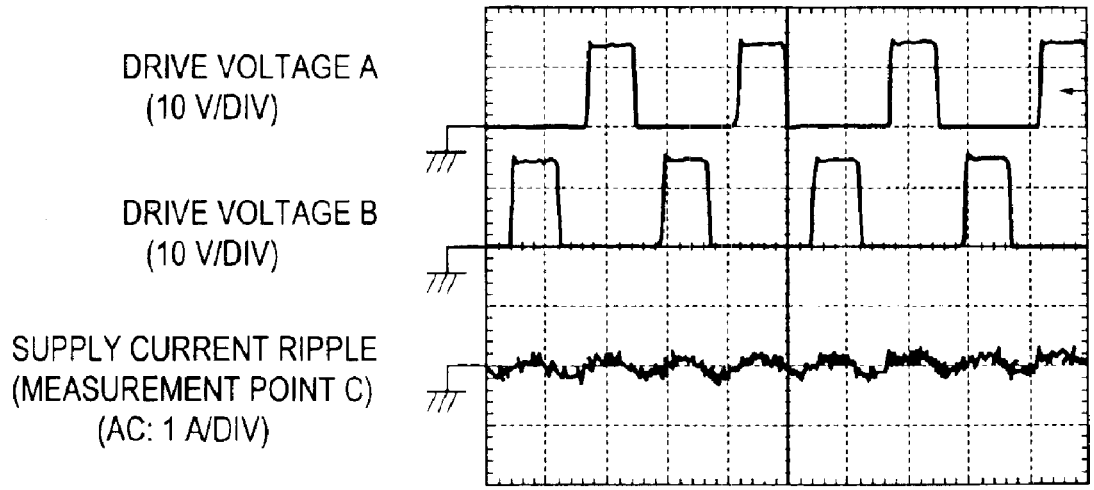

A first embodiment will be described in the following, which drives inductive loads consisting of a pair of motors. It will be assumed that the motors drive respective cooling fans (not shown in the drawings) for cooling the engine radiator and the condenser of the air conditioner system in a motor vehicle. FIG. 1 is a general system block diagram showing the overall configuration of this embodiment. This is based on a control circuit 100 which is essentially similar to the control circuit in the comparative example of FIG. 7 described above. However the control circuit 100 differs by the incorporation of a phase processing section 35, as described hereinafter. Specifically, the control circuit 100 is formed of an input signal processing section 34, the phase processing section 35, drive circuits 36A, 36B, N-channel MOS FETs 23A, 23B, diodes 24A, 24B, and a $\pi$ filter 25, as its main elements.

A battery 21 constitutes a DC power source, and motors 22A, 22B constitute respective inductive loads, which are driven by PWM operation by the control circuit 100. The motor 22A and MOS FET 23A are connected in series between the (positive) supply potential of the battery 21 and ground potential, while the motor 22B and MOS FET 23B are similarly connected in series between the supply potential of the battery 21 and ground potential. The drains of the MOS FETs 23A, 23B are connected through respective diodes 24A, 24B to one side of the $\pi$ filter 25, with the other side of the filter 25 connected to the positive potential of the battery 21, and with the diodes being connected in a direction such as to be reverse-biased when the corresponding one of the MOS FETs 23A, 23B is set in the on (i.e., conducting) state. Capacitors 31A. 32 for noise suppression are respectively connected in parallel with the diodes 24A, 24B. The source terminals of the MOS FETs 23A, 23B are connected to ground potential.

The $\pi$ filter 25 is formed of a coil 28 and capacitors 26, 27 as shown.

An engine ECU, for controlling the engine of the vehicle, is based on a microcomputer. A drive control signal, which specifies the duty ratio of PWM control signals as described in the following, is supplied from the engine ECU to the input signal processing section 34 of the control circuit 100. The drive control signal will be assumed to be a low-frequency PWM signal, having a frequency of approximately 100 Hz, whose duty ratio is set in accordance with a required level of combined output power from the motors 22A, 22B. The input signal processing section 34 converts that drive control signal to a corresponding drive command voltage, which directly determines the duty ratio of the PWM drive voltages applied to the motors 22A, 22B.

Figure 2:
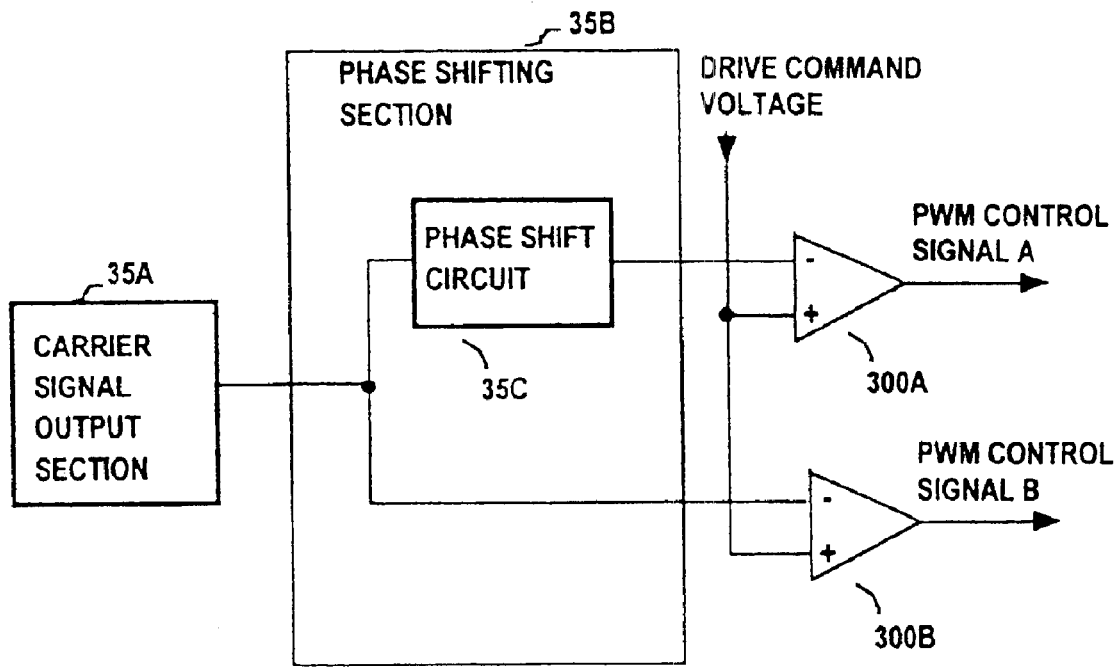
FIG. 2 is a circuit diagram for describing a phase processing section in a control circuit in the first embodiment.

As shown in FIG. 2 the phase processing section 35 is formed of a carrier signal output section 35a which produces a sawtooth-waveform carrier signal, having a frequency of approximately 19 kHz for example, a phase shift section 35b and a pair of comparators 300A, 300B. In the phase shift section 35b, the path of the carrier signal from the carrier signal output section 35a is split into two paths, with a specific amount of phase shift being applied by a phase shift circuit 35c in one path, and with the resultant phase-shifted output being applied to the inverting input terminal of the comparator 300A and the non phase-shifted carrier signal being applied to the inverting input terminal of the comparator 300B. The drive command voltage is applied to the respective other input terminals of the comparators 300A, 300B, to be thereby compared with the direct carrier signal and the phase-shifted carrier signal. Respective PWM control signals A and B, each having a duty ratio determined by the drive command signal from the input signal processing section 34, are thereby outputted from the comparators 300A, 300.

These PWM control signals A and B are respectively supplied through the drive circuits 36A, 36B to resistors 37A, 37B respectively, and resultant waveform-shaped PWM control signal A and B are supplied from the resistors 37a, 37B to the gates of the MOS FETs 23A, 23B respectively.

The operation of this embodiment is as follows. The paths of the currents that flow through the motors 22A, 22B when the corresponding MOS FETs 23A, 23B are switched on and off are identical to those described for the comparative example of FIG. 7 hereinabove. That is to say, when a MOS FET 23A or 23B is switched to the on state, current flows from the battery 21 through the corresponding one of the motors 22A, 22B and that MOS FET 23A or 23B, to ground potential, with the motor being driven thereby. When a MOS FET 23A or 23B is switched to the off state, regenerative current flows from the corresponding one of the motors 22A, 22B through the corresponding one of the diodes 24A, 24B and then through the filter 25, back to the battery 21. The flow of regenerative current is smoothed by the capacitor 26 of the filter 25.

Figure 3:
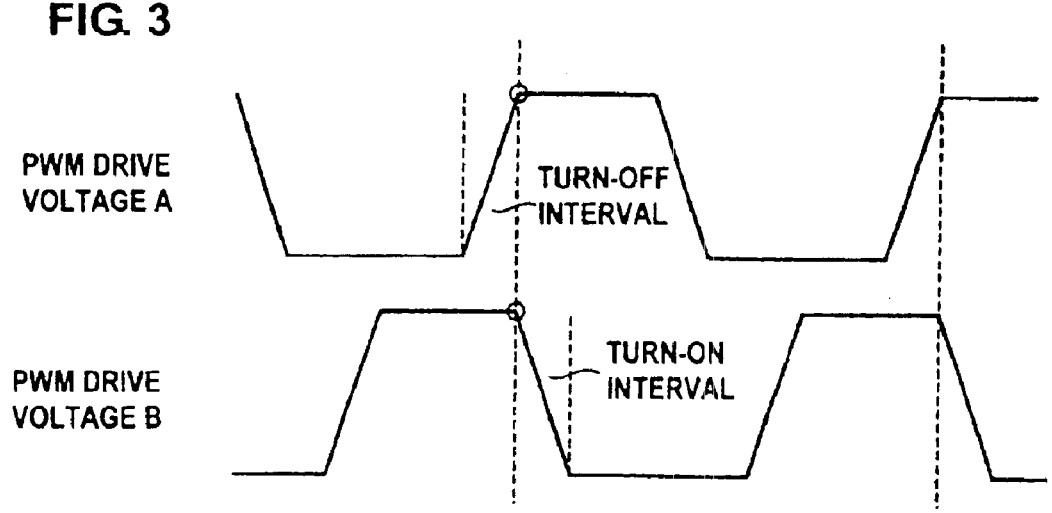
FIG. 3 is a timing diagram for use in describing a phase relationship of PWM drive voltages with the first embodiment.

The input PWM signals produced from the phase processing section 35 are transferred through the series-connected resistors 37A, 37B respectively, for thereby converting these to respective waveform-shaped PWM control signals A and B, having a trapezoidal waveform, which are supplied to the gates of the MOS FETs 23A, 23B respectively, with the waveform-shaped PWM control signals A and B having a specific amount of phase difference between them as determined by the phase control section 35b. This is illustrated in the timing diagram of FIG. 3, in which respective drive voltages of the MOS FETs 23A, 23B resulting from applying the waveform-shaped PWM control signals are designated as PWM drive voltage A, PWM drive voltage B. As shown, the aforementioned phase difference is established such that the point of termination of each falling edge of a specific one of these PWM signals (i.e., since P-channel MOS FETs are used in this embodiment, the end of a turn-off interval of the corresponding MOS FET) coincides with the point of commencement of a rising edge of the other one of the signals, so that a turn-on interval of one MOS FET begins immediately after a turn-off interval of the other MOS FET has terminated.

Figure 9A:
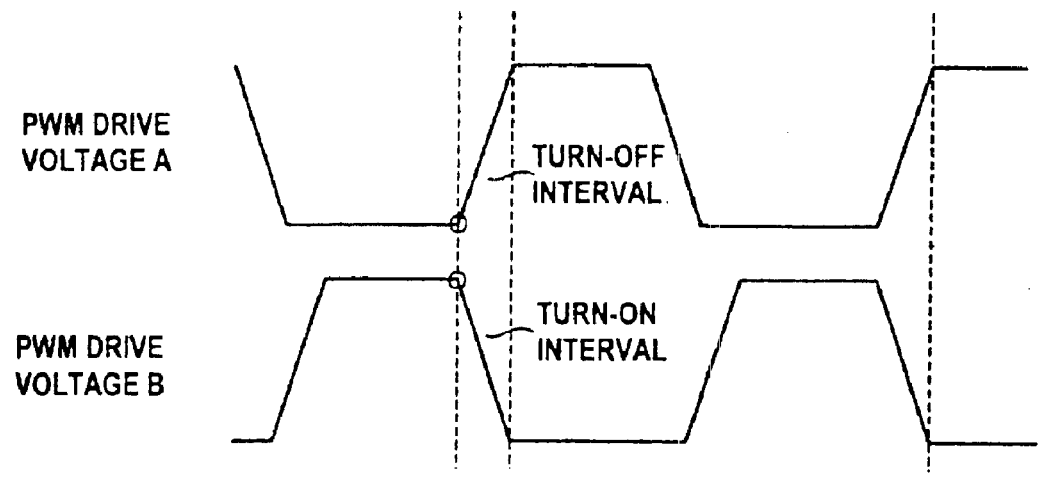
FIG. 9A is a timing diagram for illustrating a phase relationship between PWM drive voltages with a prior art type of PWM load drive apparatus.

Thus, by establishing such a phase relationship for the PWM control signals, each time that the MOS FET 23B begins to be turned on, the MOS FET 23A has already completed the process of being turned off. This ensures that the amount of ripple in the supply current of the battery 21 is reduced to a low amplitude, thereby reducing the level of electrical noise that is generated by the operation of the inductive load drive apparatus. In addition, a condition is avoided whereby both of the MOS FETs 23A, 23B change from a state in which both of these are off to a state in which one FET is changing from off to on while the other FET is changing from on to off, as described above referring to FIG. 9A. Thus, waveform distortion of the residual amount of ripple in the supply current of the battery 21 is suppressed.

In addition to the above conditions being satisfied by the phase relationship between the switching of the MOS FETs 23A, 23B, preferably a further condition should be satisfied, whereby when one of the MOS FETs 23A, 23B enters the on state, the other FET remains in the off state for a substantially long interval (i.e., an interval which should be as long as possible with respect to the duration of the interval for which the first-mentioned FET remains in the on state). If that condition is satisfied, then the level of regenerative current which flows in the capacitor 26 of the filter 25 will be lowered. That condition is satisfied by forming the waveform-shaped control signals with a trapezoidal waveform as described above.

That is to say, during an interval in which one of the MOS FETs 23A, 23B is in the on state and the other is in the off state, regenerative current flows into the capacitor 26 from the one of the motors 22A, 22B that is controlled by the FET which is in the off state. However at the same time, current is being supplied from the battery 21 to the one of the motors 22A, 22B that is controlled by the FET which is in the on state. That flow of current acts to compensate for the regenerative current flow of current into the capacitor 26, i.e., acts in a direction tending to discharge the capacitor 26. Thus, since these two flows of current into the capacitor 26 serve to mutually cancel, the effective level of regenerative current that flows in the capacitor 26 is reduced.

Figure 4A:
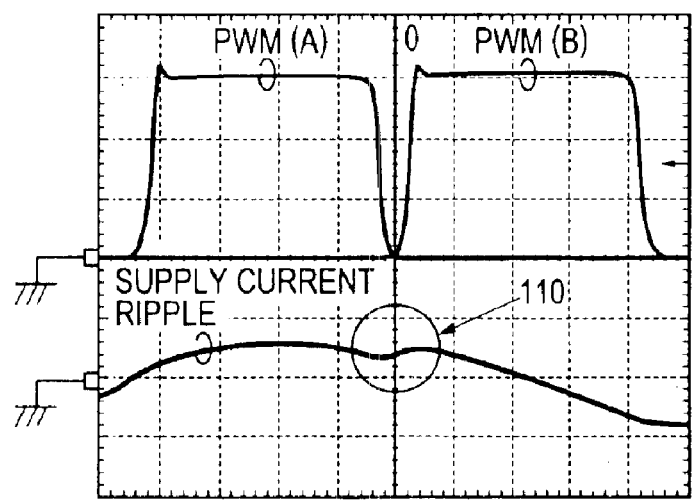
FIGS. 4A to 4C are examples of measured waveforms of PWM control signals and of supply current ripple.
Figure 4B:
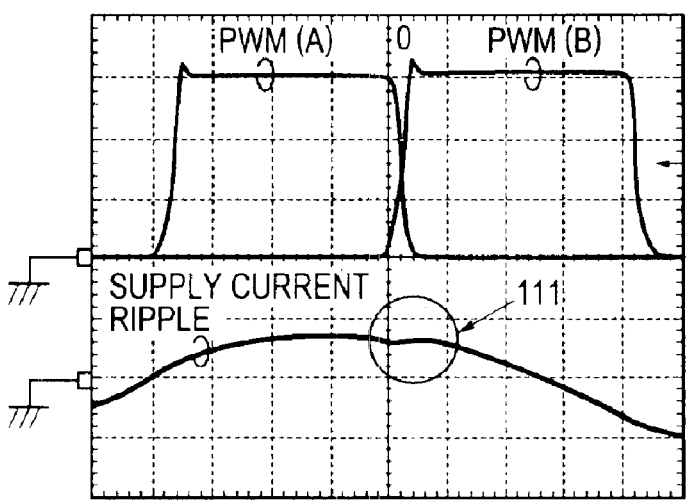
Figure 4C:
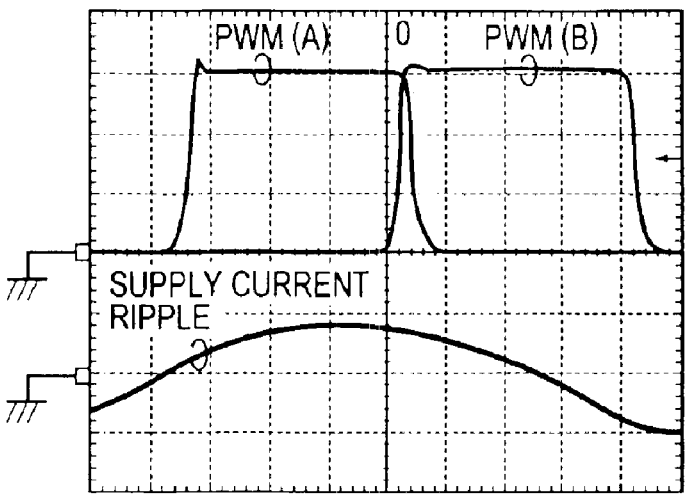

FIGS. 4A, 4B, 4C illustrate the results of oscilloscope measurement of the ripple waveform of the supply current of the battery 21 (measured at the positive terminal of the battery 21) in relation to changes in the phase relationship between the aforementioned PWM control signals A and B, with these signals being designated in FIGS. 4A to 4C as PWM (A) and PWM (B) respectively. As shown in FIG. 4A, if the transitions between the on to off and off to on states of the MOS FETs 23A, 23B are kept completely separate, with no overlapping, then a large amount of distortion occurs in the ripple waveform. FIG. 4B illustrates the case in which there is a partial overlap between these transitions, i.e., during each transition of MOS FET 23A from the off to the on state, a transition of MOS FET 23B from the on to the off state occurs. As shown, a significant amount of distortion of the ripple waveform remains. However as shown in FIG. 4C, if the aforementioned phase conditions of the present invention are established for the PWM control signals A and B whereby each timing of the start of turning on one of the FETs (in this example, MOS FET 23A) coincides with the timing of termination of turning off the other one of the FETs (in this example, MOS FET 23B), then the distortion of the ripple waveform is effectively suppressed.

Figure 5:
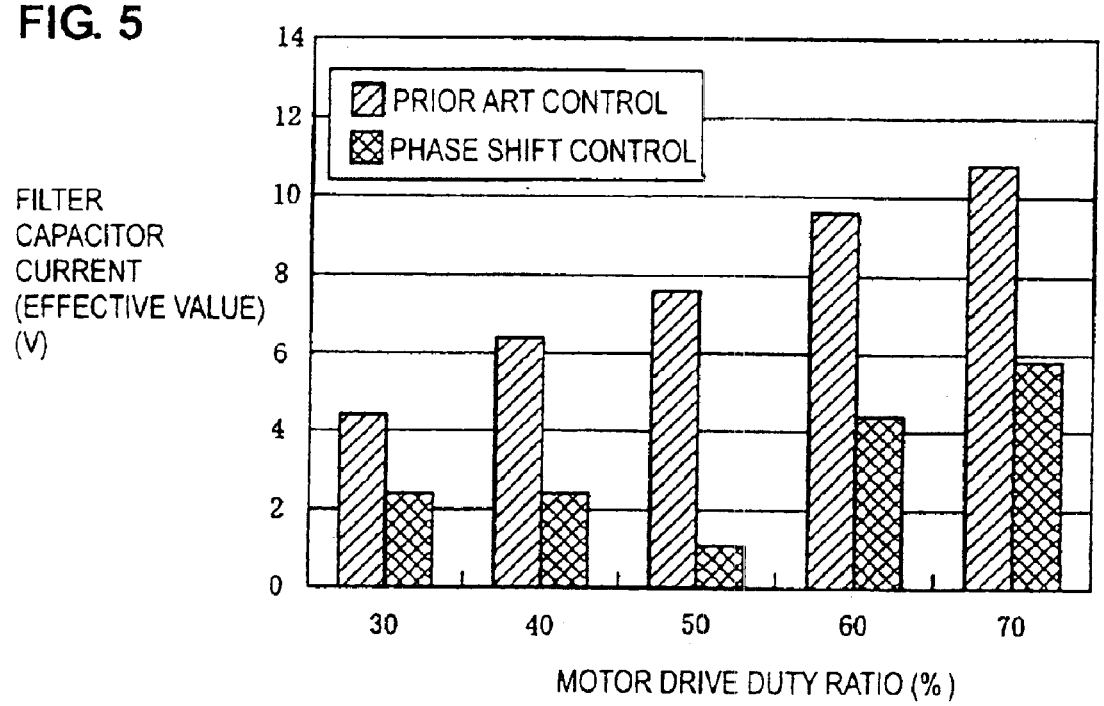
FIG. 5 is a bar chart for illustrating a relationship between the duty ratio of a PWM drive voltage applied to a motor and an effective level of current which flows in a capacitor of a $\pi$ filter, for the case of the prior art and for the case of the first embodiment respectively.
Figure 9B:
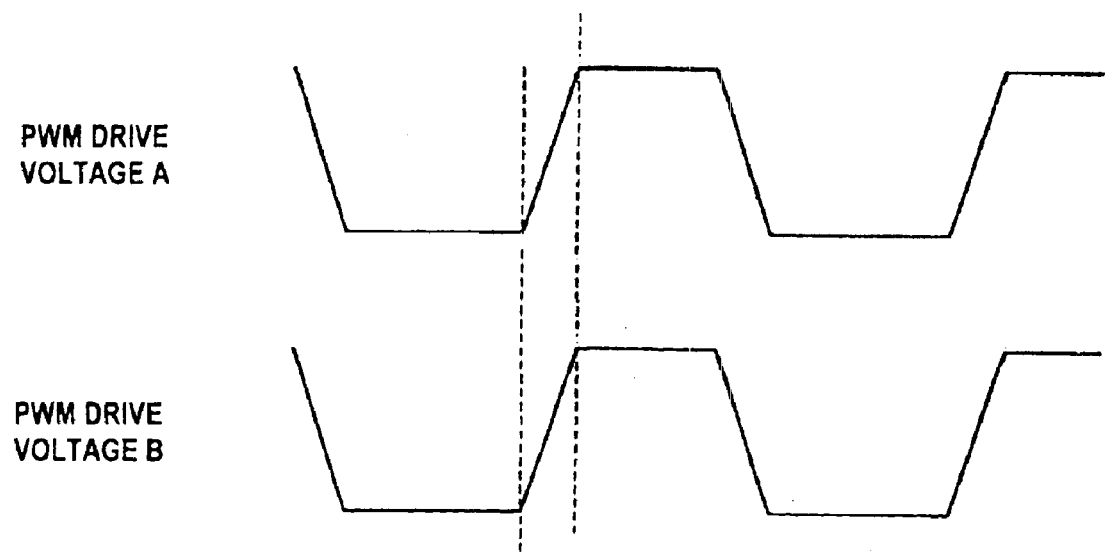
FIG. 9B is a timing diagram showing a condition in which two PWM drive voltages for respective motors are of identical phase.

FIG. 5 is a bar chart which illustrates the effective level of current which flows in the capacitor 26 of the π filter 25, for the case of an inductive load drive apparatus using PWM control signals to which the phase control of the above embodiment is not applied, and for the case of using PWM control signals having a phase relationship as described for the above embodiment. Here, the term "phase control is not applied" signifies that the two PWM control signals are of identical phase, as illustrated in the waveform diagram of FIG. 9B. The measurement conditions are that the power source voltage is 15.1 V, there are two 200 W loads, the PWM frequency is 19 kHz, and the PWM duty ratio is varied from 30% to 70% in steps of 10%. As can be understood from this diagram, by using the control method of this embodiment, the level of current which flows in the capacitor 26 is made substantially lower than for the prior art, for all values of duty ratio.

If the duty ratio of the two PWM control signals is close to 50%, then with the above embodiment, occurrence of coincidence between the timing of the start of a falling edge of a first one of the PWM control signals and the timing of the start of a rising edge of the second PWM control signal will occur in alternation with occurrence of coincidence between the timing of the start of a falling edge of the second PWM control signal and the timing of the start of a rising edge of the first PWM control signal.

That is to say, if the duty ratio is less than 50% then the control signals are applied such that for (an arbitrarily determined) one of the two switching elements, each transition of that switching element from the on (i.e., conducting) state to the off (i.e., non-conducting) state coincides with the commencement of a transition of the other one of the switching elements from the off to the on state. If the duty ratio is 50%, then that condition applies to both of the switching elements.

The term "first-direction edge" of a control signal as used in the appended claims has the special significance of "a transition of that control signal in a direction whereby the corresponding controlled switching element is changed from the on to the off state". Similarly, the term "second-direction edge" has the special significance of "a transition of that control signal in a direction whereby the corresponding controlled switching element is changed from the off to the on state".

As can be understood from the above, with this embodiment, the two PWM control signals A, B that are applied to control the P-channel MOS FETs 23A, 23B respectively, with a duty ratio determined by the drive command signal supplied from the engine ECU, are configured such that each start of a falling edge of one of the PWM control signals coincides with the timing of the termination of a rising edge of the other one of the PWM control signals. As result, in addition to reducing the level of ripple in the supply current, distortion of the waveform of that ripple is also substantially reduced. Hence, the capacitor 26 of the π filter 25 need only have a small value of capacitance, while enabling electrical noise that is generated by operation of the inductive load drive apparatus to be substantially reduced by comparison with the prior art.

Furthermore, by incorporating the resistors 37A, 37B to perform a waveform shaping function, it is ensured that each of the waveform-shaped PWM control signals A and B applied to the gates of the MOS FETs have a trapezoidal waveform, so that each of these signals rises and fall gradually. This further assists in reducing the level of electrical noise which is generated by operation of the apparatus. Utilizing such a waveform results in an increased duration of each of the turn-on and turn-off intervals of the MOS FETs 23A, 23B. However due to the action of the phase processing section 35, it is ensured that overlapping of these turn-on and turn-off intervals of respective FETs is avoided. Hence, lowering of the overall electrical noise is effectively achieved.

Figure 6:
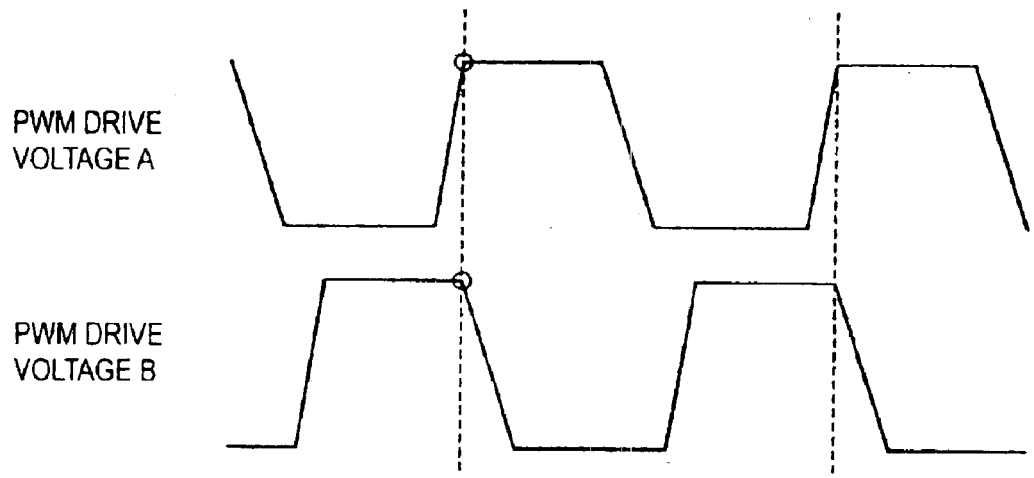
FIG. 6 is a timing diagram of an example of PWM drive voltages for the case of an alternative configuration in which PWM control signals are applied in push-pull form.

It should be noted that various modifications to the above embodiment could be envisaged. For example, with the above embodiment, each of the PWM control signals A, B is applied by single-ended output from a drive circuit, through a resistor to the gate of the corresponding switching element. However it would be equally possible to use a push-pull type of drive circuit, in which one output of a drive circuit (i.e., the push-up output) is connected through a first resistor to the gate of the corresponding MOS FET and a second output (i.e., the pull-down output) is connected through a second resistor to that gate. In that case, as illustrated in FIG. 6, it may be preferable to make the respective durations of each turn-on interval and turn-off interval different from one another, by setting respective appropriate values for the above-mentioned first and second resistors.

Furthermore the above embodiment has been described for the case of using trapezoidal PWM control signals, however, depending upon the level of electrical noise that is permissible, it may be possible to use a rectangular waveform.

Moreover the invention is not limited to the use of MOS FETs as switching elements, and is equally applicable to various other types of controlled switching elements such as bipolar power transistors, IGBT (insulated gate bipolar transistors), etc.

Furthermore it would be equally possible to connect these as high-end switching elements, i.e., each connected between the high potential of the power source (e.g., B+ potential, with the above embodiment) and the corresponding motor.

Moreover the invention is not limited to the case of driving inductive loads that are motors which drive cooling fans of a vehicle, but is applicable in general to cases in which two inductive loads must be driven mutually independently by PWM operation.

Figure 10:
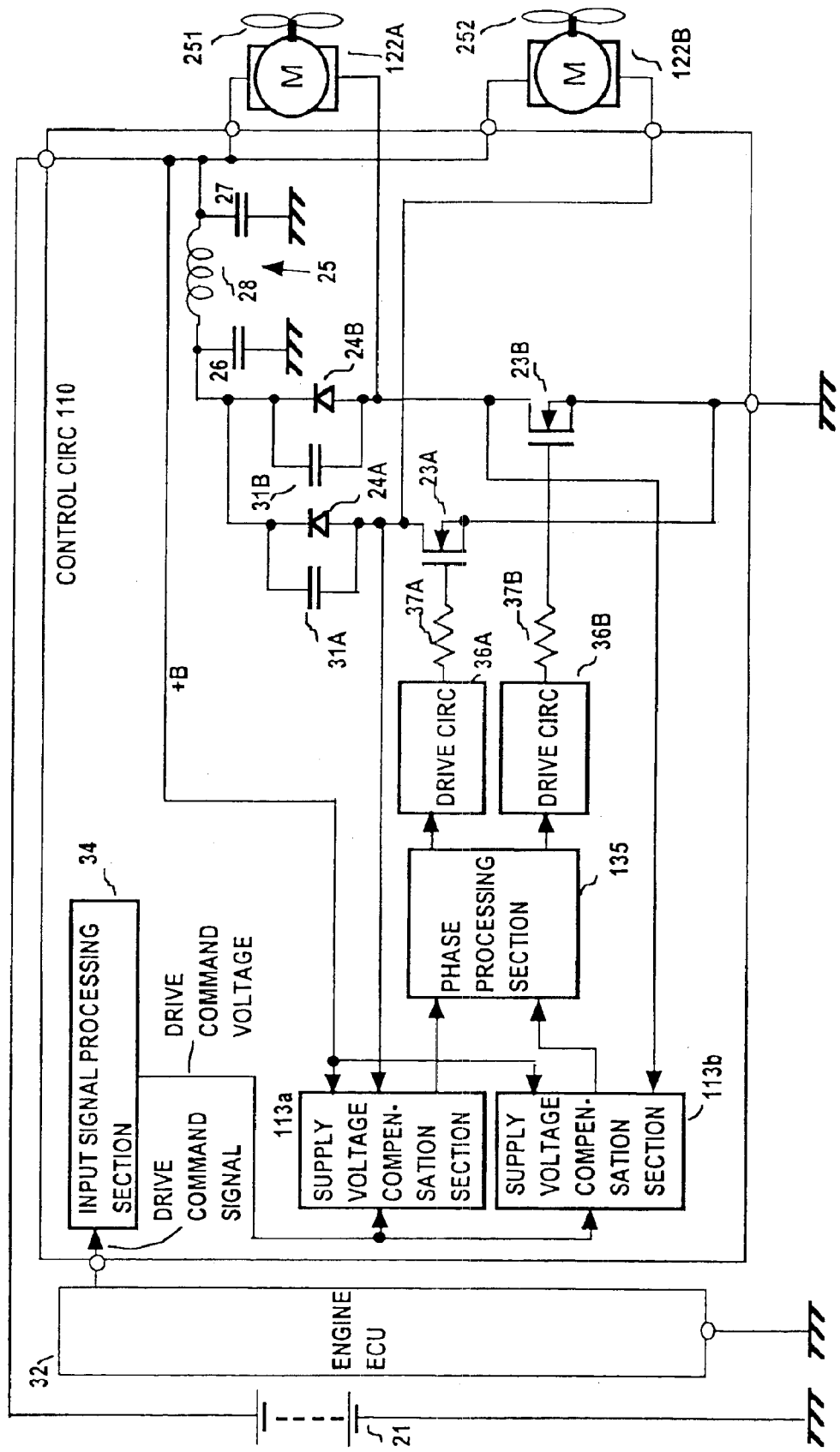
FIG. 10 is a general system block diagram of a second embodiment of an inductive load drive apparatus, which drives motors having respectively different ratings.

A second embodiment will be described, referring first to the general system block diagram of FIG. 10. As for the first embodiment, the second embodiment is an inductive load drive apparatus mounted in a motor vehicle, which drives a pair of inductive loads consisting of respective motors 122A, 122B, which have respectively different power ratings. With this embodiment the motors 122A and 122B are coupled to drive respective cooling fans 251, 252, which direct a flow of air into the engine radiator (not shown in the drawing) and the condenser (not shown in the drawing) of the air conditioner system of the vehicle. Although the principles of this embodiment are applicable to control of the output power of electric motors which drive various types of load, it should be understood that in the following description of the embodiment, the term "output power produced by a motor" signifies the output power measured as a rate of airflow that is generated by a fan which is driven by the motor.

The embodiment basically consists of a control circuit 110 which is powered by the battery 21 of the vehicle and receives a drive command signal from the engine ECU 32 of the vehicle. The drive command signal is assumed to be a low-frequency PWM signal whose duty ratio is indicative of a required rate of flow of cooling air that is to be supplied by the cooling fans 251, 252 in combination.

The control circuit 110 is formed of an input signal processing section 34, a phase processing section 135, drive circuits 36A, 36B, drive voltage compensation sections 113A, 113B, MOS FETs 23A, 23B, diodes 24A, 24B, and a π filter 25.

The motors 122A, 122B are driven by PWM operation by the control circuit 110, with the motor 122A and MOS FET 23A being connected in series between the (positive) potential of the battery 21 and ground potential, and the motor 122B and MOS FET 23B similarly connected in series between the positive potential of the battery 21 and ground potential. The drains of the MOS FETs 23A, 23B are connected through respective diodes 24A, 24B to one side of the π filter 25, with the other side of the filter 25 connected to the positive potential of the battery 21, and with the diodes being connected in a direction such as to be reverse-biased when the corresponding one of the MOS FETs 23A, 23B is set in the on (i.e., conducting) state. Capacitors 31A, 31B for noise suppression are respectively connected in parallel with the diodes 24A, 24B. The n filter 25 is formed of a coil 28 and capacitors 26, 27 as shown. These components correspond in function to the correspondingly numbered components of the first embodiment.

The input signal processing section 34 converts the drive command signal to a drive command voltage, which is supplied from the input signal processing section 34 to each of the drive voltage compensation sections 113A, 113B. The positive potential (indicated as +B) of the battery 21 is supplied to each of the drive voltage compensation sections 113A, 113B, while the voltages appearing at the drains of the MOS FET 23A and the MOS FET 23B are supplied to the drive voltage compensation sections 113A, 113B respectively. A pair of compensated drive command voltages, generated as described hereinafter, are produced from the drive voltage compensation sections 113A, 113B, and are inputted to the phase processing section 135. The phase processing section 135 generates a resultant pair of PWM control signals A and B, having respective duty ratios that are separately determined by the phase processing section 135 as described hereinafter, which are applied through the drive circuits 36A, 36b to the resistors 37A, 37B respectively, to be each subjected to waveform shaping for being converted from a rectangular waveform to a trapezoidal waveform, as described for the first embodiment. The resultant waveform-shaped PWM control signals A and B from the resistors 37a, 37B are applied as respective gate drive signals to the MOS FETs 23A, 23B respectively, with the advantages of a trapezoidal waveform gate drive signal being thereby obtained as described hereinabove for the first embodiment.

It can thus be understood that this embodiment essentially differs from the first embodiment described above in that the motors 122A, 122B of the second embodiment have respectively different power ratings, and further differs by incorporating the drive voltage compensation sections 113A, 113B, and by the functions performed by the drive voltage compensation sections 113A, 113B in conjunction with the phase processing section 135, as described in the following.

The operation and internal configuration of each of the drive voltage compensation sections 113A, 113B, and their relationship to the input signal processing section 34 and phase processing section 135, will be described referring to the partial system block diagram of FIG. 11, in which only those components necessary for describing the operation of the drive voltage compensation sections 113A, 113B are shown. In the following, system components which are common to both of the drive voltage compensation sections 113A, 113B will in general be referred to by the corresponding reference numeral without the A or B suffix, for brevity of description.

As shown, each drive voltage compensation section 113 is formed of a voltage divider 215, an amplifier 216, and an integrator 217. The voltage divider 215 is formed of resistors 218, 219 connected in series between the positive potential of the battery 21 and ground potential. The amplifier 216 is formed of an operational amplifier 220, with a resistor 221 and capacitor 222 connected in parallel between the inverting input terminal and output terminal, and having the junction of the resistors 218, 219 connected to the non-inverting input terminal. In addition, the inverting input terminal of the operational amplifier 220 is connected via a resistor 223 to the drain of the MOS FET 23. The integrator 217 performs both the functions of an integrator circuit and a voltage subtractor, and is made up of an operational amplifier 224 having a capacitor 226 connected between the inverting input terminal and output terminal, and having the inverting input terminal connected via a resistor 225 to the output terminal of the operational amplifier 220. The drive command voltage produced from the input signal processing section 34 is supplied to the non-inverting input terminal of the operational amplifier 224.

The phase processing section 135 is formed of a carrier signal output section 227 and a phase shifting section 228, and comparators 229A, 229B. The functions of these respectively correspond to those of the carrier signal output section 35A, the phase shifting section 35B and the comparators 300A, 300B of the phase processing section 35 of the first embodiment, described above referring to FIG. 2. The comparators 229A, 229B constitute a PWM signal generating section, with the comparator 229A receiving at its non-inverting input terminal (from the integrator 224A) a compensated drive command voltage A, which is the difference between the drive command voltage from the input signal processing section 34 and a compensation voltage which is produced from the amplifier 216A. Similarly, the comparator 229B receives at its non-inverting input terminal (from the integrator 224B) a compensated drive command voltage B, which is the difference between the drive command voltage from the input signal processing section 34 and a compensation voltage that is produced from the amplifier 216B.

The comparators 229A, 229B thereby produce respective PWM control signals A and B, whose duty ratios are separately determined by the compensated drive command voltage A and compensated drive command voltage B respectively. The PWM control signals A and B are supplied to the drive circuits 36A, 36B repectively.

Preferably, in the same way as described hereinabove for the phase processing section 35 of the first embodiment, the amount of phase difference established between the phase-shifted carrier signal and non phase-shifted carrier signal by the phase shifting section 228 of the phase processing section 135 is such that each timing of the termination of a rising edge of one of the PWM control signals A and B (when these are applied as waveform-shaped gate control signals to the MOS FETs 23A, 23B) coincides with the timing of the start of a falling edge of the other one of these PWM control signals.

Each amplifier 216 produces a compensation voltage whose value is equal to the average drive voltage being applied to the corresponding one of the MOS FETs 23A, 23B, multiplied by a specific amplification factor, as described in the following. Any change in the difference between that compensation voltage and the drive command voltage, appearing at the output of the corresponding integrator 224, results in a flow of charging current into the capacitor 226 of that integrator.

It is a basic feature of this embodiment that the amplification factor of each amplifier 216 is preset in accordance with the power output rating of the corresponding one of the motors 122A, 122B. This is done in order to apply respectively different appropriate values of (average) drive voltage to the motors 122A, 122B, such as to substantially equalize the respective levels of output power from the motors, and maintain that equalized relationship irrespective of changes in the drive command signal from the engine ECU.

Designating the supply voltage value of the battery 21 as B, the respective values of the resistors 218A and 219A as R1, R2, and assuming that the respective values of the resistors 223A and 221A of the amplifier 216A are also equal to R1 and R2, the value of the reference voltage B'A is obtained as R2.B/(R1+R2). Designating the average value of voltage appearing at the drain of the MOS FET 23A as VDA and the value of the compensation voltage A that is produced from the amplifier 216A as VOA, the following is true:

$$VOA=B'A+(R2/R1)(B'A-VDA)=(B-VDA) \quad (1)$$

Thus in that case, the output voltage VOA from the amplifier 216A is the difference between the power supply voltage (applied to one terminal of the motor 122A) and the average value of drain voltage of the MOS FET which drives that motor (applied to the other term of the motor). That is to say, with the above-described relationships of resistor values for the amplifier 216A, the output voltage VOA is equal to the average value of drive voltage applied to the motor 122A multiplied by an amplification factor of one.

Hence the duty ratio of the PWM control signal A is determined by a compensated drive command voltage that is obtained by combining the average drive voltage of the motor 122A (multiplied by an amplification factor that can be arbitrarily preset) with the drive command voltage. With this embodiment, the combining is performed by subtraction of voltages, however the invention is not limited to such a method.

Similarly in the case of the drive voltage compensation section 113B, designating the respective values of the resistors 218B and 219B as R3, R4, and assuming that the respective values of the resistors 223B and 221B of the amplifier 216B are also equal to R3 and R4 so that the amplification factor of the amplifier 216B is 1, and designating the average value of voltage appearing at the drain of the MOS FET 23B as VDB and the output voltage from the amplifier 216B as VOB, the following equation can be established:

$$VOB=B'B+(R2/R1)(B'B-VDB)=(B-VDB) \quad (2)$$

In this case the value of the reference voltage B'B is obtained as R4.B/(R3+R4).

Thus for example by adjusting the values of the resistors 218A, 219A, 221A, 223A such as to alter the amplification factor of the amplifier 216A by a requisite amount, the actual duty ratio of the PWM control signal A can be adjusted to a value appropriately different from the duty ratio of the PWM control signal B.

It can thus be understood that, although both of the motors 122A, 122B are controlled in common by the drive command signal that is supplied from the engine ECU 32, by setting the aforementioned resistance values R1 to R4 appropriately, PWM control signals having respectively different values of duty ratio (determined in accordance with the power ratings of the motors 122A, 122B) can be supplied to the drive circuits 36A and 36B, with the MOS FETs 23A, 23B being thereby switched with correspondingly different duty ratios. Hence, the amplification factors of the amplifiers 216A, 216B can be preset such as to apply equivalent levels of drive voltage to the motors 122A, 122B, i.e., such as to equalize the respective levels of power that are produced by the motors 122A, 122b. That condition of equalized levels of power, to produce equalized levels of air flow from the fans 251, 252, will be substantially maintained as the duty ratio of the drive command signal supplied from the engine ECU 32 is varied.

Figure 12:
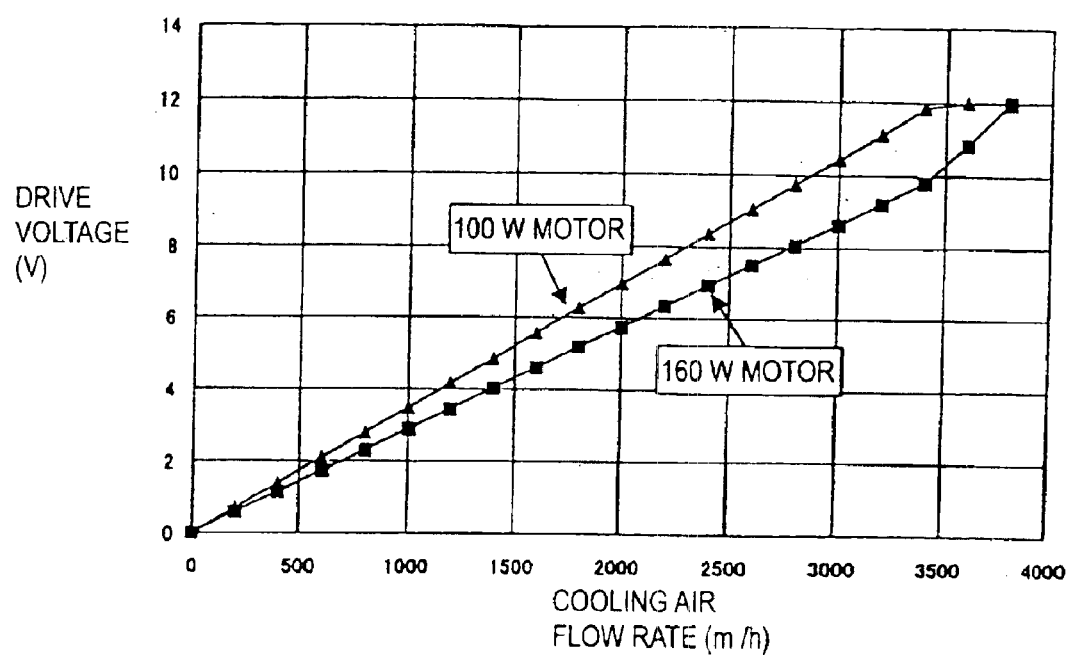
FIG. 12 is a graph illustrating relationships between values of drive voltage applied to respective motors having different ratings and resultant values of air flow rate produced by fan that are driven by the motors.

FIG. 12 shows an example of graphs of the relationship between (average) drive voltage applied to a motor and resultant air flow rate from a fan driven by the motor, for the case of a 100 W and a 160 W motor respectively. As shown, for example the air flow rate produced by the fan of the 160 W motor is 2000 m$^3$/h with a drive voltage of approximately 5.8 V, whereas it is necessary to apply a drive voltage of 7.0 V to the 100 W motor in order to achieve the same air flow rate. Assuming that the 160 W motor and 100 W motor respectively correspond to the motors 122A, 122B of the second embodiment, it can be understood that the amplification factor of the amplifier 216B can be preset by adjusting the values of the resistors 218B, 219B, 221B, 223B appropriately. That is to say, the amplification factor would be preset such that when a drive voltage of 5.8 V is being supplied to the motor 122A, the duty ratio of switching the FET 23B is increased relative to that of the FET 23A to an extent that a drive voltage of 7.0 V is supplied to the motor 122B. In that way, equivalent levels of (average) drive voltage can be applied to the motors 122A, 122B, such that identical values of air flow rate are produced by the cooling fans 251, 252.

As a result, greater efficiency of cooling is achieved, signifying that a reduced level of energy is consumed by the apparatus, by comparison with the prior art.

Although the second embodiment has been described for the case of driving two motors which are controlled in common from a single drive command signal, it would be equally possible to drive three or more motors. In that case, the motors could all have respectively different values of power rating. However for example if two of the motors have the same rating and one of the motors has a different rating, then the adjustment of duty ratio as described above, to apply equivalent levels of drive voltage to the respective motors, need only be applied to the motor which has the different rating.

Figure 13:
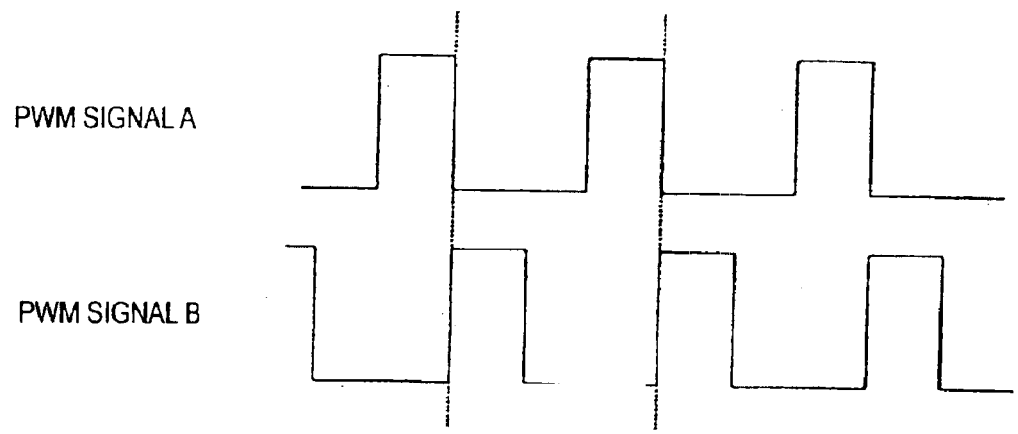
FIG. 13 is a timing diagram of an example of PWM control signals having a rectangular waveform.

It should also be noted that although the second embodiment has been described for the case of forming the (gate drive) PWM control signals with a trapezoidal waveform, it would be equally possible to utilize a rectangular waveform for these control signals as illustrated in FIG. 13, if the level of generated electrical noise is acceptable.

Figure 11:
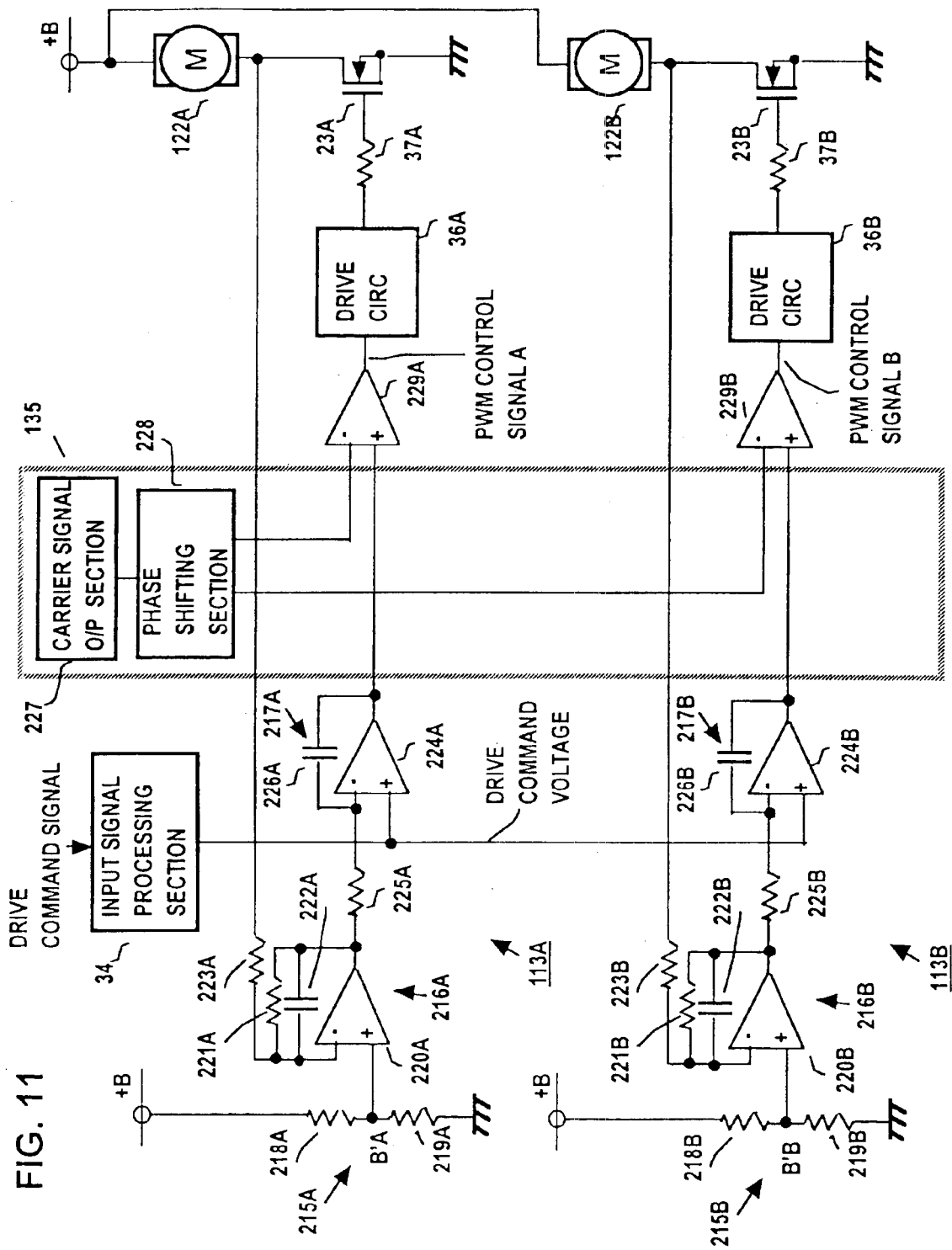
FIG. 11 is a circuit block diagram showing details of drive voltage compensation sections of a control circuit in the second embodiment.

It should also be noted that the invention is not limited to the circuit configuration shown in FIG. 11 for establishing respectively different values of duty ratio for driving the motors, and that other forms of circuit configuration could be utilized which fall within the scope claimed for the present invention, so long as it becomes possible to preset a condition whereby respectively different values of duty ratio are established for driving a plurality of motors having various different power ratings, whose combined power output level is controlled based on a single drive command signal, with the respective duty ratios being changed in accordance with changes in the drive command signal in such a manner as to apply equivalent levels of average drive voltage to the respective motors, for thereby maintaining respectively identical levels of output power from the motors, or maintaining respectively identical levels of a parameter such as air flow rate of devices such as fans which are driven by the respective motors.

Moreover, as for the first embodiment, the second embodiment is not limited to the use of MOS FETs for driving the motors, and could be utilized to control various other types of switching devices such as power bipolar transistors, IGBTs, etc.

The above description of embodiments should therefore be taken in a descriptive sense and not in a limiting sense.

What is claimed is:

1. In an inductive load drive apparatus for performing PWM (pulse width modulation) switching of current from a DC power source to separately drive two inductive loads, a control circuit including two switching elements which are respectively connected in series between said two inductive loads and said DC power source, each of said switching elements controllable for being selectively set in an on state and an off state for enabling and interrupting a flow of a drive current through the corresponding one of said inductive loads, filter means connected in a flow path of a regenerative current which is generated when either or both of said switching elements is set in said off state, and a PWM control signal generating section for generating two PWM control signals for controlling respective ones of said switching elements, with a duty ratio of said PWM control signals determined based on an externally supplied drive command signal;

wherein said control circuit comprises phase control means for controlling the operation of said PWM control signal generating section such that each timing of termination of a first-direction edge of at least one of said two PWM control signals, whereby a corresponding switching element is changed to said off state, coincides with a timing of commencement of a second-direction edge of the other one of said PWM control signals, whereby a corresponding switching element is changed to said on state.

2. The inductive load drive apparatus according to claim 1, wherein said filter means comprises a π-configuration filter formed of an inductor and two capacitors.

3. The inductive load drive apparatus according to claim 1, wherein said drive circuit means comprises waveform shaping means for converting said first and second PWM control signals to respective waveform-shaped PWM control signals having a trapezoidal waveform, said waveform-shaped PWM control signals having said timing relationship between said first-direction edges and second-direction edges thereof, and being applied to control corresponding ones of said switching elements.

4. The inductive load drive apparatus according to claim 1, wherein said switching elements are field effect transistors, and wherein said waveform shaping means comprises a pair of resistors coupled to supply respective ones of said PWM control signals to corresponding gate electrodes of said field effect transistors.

5. The inductive load drive apparatus according to claim 1 wherein said inductive loads are constituted by a pair of motors having respectively different values of power rating, wherein said control circuit comprises a supply voltage compensation section for applying compensation to said PWM control signals such that respectively equivalent values of drive voltage are applied to said motors and substantially identical levels of drive power are thereby produced by said motors.

6. The inductive load drive apparatus according to claim 5 wherein said motors are coupled to rotate respective cooling fans, and wherein said compensation is applied such that substantially identical values of air flow rate are produced by said cooling fans.

7. The inductive load drive apparatus according to claim 5 wherein said control circuit comprises first and second drive voltage compensation sections for acting on said PWM control signal generating section to determine respective duty ratios of said PWM control signals in accordance with said respective values of power rating and respective values of average drive voltage that are being applied to said motors.

8. The inductive load drive apparatus according to claim 7 wherein said drive command signal is expressed as a drive command voltage, and wherein each of said drive voltage compensation sections comprises an amplifier circuit for deriving said average drive voltage as an average difference between a supply voltage of said DC power source and a voltage applied to the corresponding one of said motors from the corresponding one of said switching elements, and for multiplying said average drive voltage by a preset amplification factor determined based on said power rating of said corresponding motor, to obtain a compensation voltage, and combining means for combining said compensation voltage with said drive command voltage to obtain a compensated drive command voltage;

wherein said PWM control signal generating means is controlled by said compensated drive command voltage for determining said duty ratio of said PWM control signal which controls said corresponding switching element.

9. The inductive load drive apparatus according to claim 8 wherein said combining means comprises means for subtracting said compensation voltage from said drive command voltage.

10. In an inductive load drive apparatus for performing PWM (pulse width modulation) switching of current from a DC power source to separately drive a plurality of motors which rotate respective cooling fans, including at least two motors having respectively different values of power rating, a control circuit including a plurality of switching elements which are respectively connected in series between said motors and said DC power source, each of said switching elements controllable for being selectively set in an on state and an off state for enabling and interrupting a flow of a drive current through the corresponding one of said motors, and a PWM control signal generating section for generating a plurality of PWM control signals for controlling respective ones of said switching elements, with a duty ratio of said PWM control signals determined based on an externally supplied drive command signal;

wherein said control circuit comprises a supply voltage compensation section for applying compensation to said PWM control signals applied to said switching elements such that equivalent values of average drive voltage are applied to said motors, whereby substantially identical values of air flow rate are produced by said cooling fans.

11. The inductive load drive apparatus according to claim 10 wherein said control circuit comprises a plurality of drive voltage compensation sections respectively corresponding to said motors, responsive to respective values of average drive voltage currently being applied to said motors for acting on said PWM control signal generating section to determine respective duty ratios of said PWM control signals such as to determine said equivalent values of average drive voltage.

12. The inductive load drive apparatus according to claim 11 wherein said drive command signal is expressed as a drive command voltage, and wherein each of said drive voltage compensation sections comprises an amplifier circuit for deriving said average drive voltage as an average difference between a supply voltage of said DC power source and a voltage applied to the corresponding one of said motors from the corresponding one of said switching elements, and for multiplying said average drive voltage by a preset amplification factor determined based on said power rating of said corresponding motor, to obtain a compensation voltage, and combining means for combining said compensation voltage with said drive command voltage to obtain a compensated drive command voltage;

wherein said PWM control signal generating means is controlled by said compensated drive command voltage for determining said duty ratio of said PWM control signal which controls said corresponding switching element.

13. The inductive load drive apparatus according to claim 12 wherein said combining means comprises means for subtracting said compensation voltage from said drive command voltage.

* * * * *